United States Patent [19]
Lazraq et al.

[11] Patent Number: 6,091,728
[45] Date of Patent: Jul. 18, 2000

[54] ATM SWITCH CORE

[75] Inventors: Tawfik Lazraq; P. Bergstedt, both of Stockholm; Hannu Tenhunen, Täby; Mehran Mikhtari, Spånga, all of Sweden

[73] Assignee: Telefonaktiebolaget LM Ericsson, Stockholm, Sweden

[21] Appl. No.: 08/962,870

[22] Filed: Nov. 3, 1997

Related U.S. Application Data

[63] Continuation of application No. PCT/SE96/00610, May 9, 1996.

[30] Foreign Application Priority Data

May 9, 1995 [SE] Sweden ................................ 9501720

[51] Int. Cl.⁷ .................................................. H04L 12/56
[52] U.S. Cl. .......................... 370/395; 370/360; 370/381
[58] Field of Search ..................................... 370/386, 395, 370/409, 423, 385, 410, 522, 384, 412, 413, 415, 391, 360, 369, 370, 371, 380, 381, 389, 375, 535, 376, 377, 378, 388

[56] References Cited

U.S. PATENT DOCUMENTS

| | | | |
|---|---|---|---|
| 4,543,652 | 9/1985 | Amada et al. | 370/375 |
| 4,623,996 | 11/1986 | McMillen . | |
| 4,890,280 | 12/1989 | Hirata | 370/413 |
| 4,922,488 | 5/1990 | Niestegge | 370/413 |
| 5,091,905 | 2/1992 | Amada | 370/415 |
| 5,535,202 | 7/1996 | Kondoh . | |

FOREIGN PATENT DOCUMENTS

| | | |
|---|---|---|
| 0 405 042 | 1/1991 | European Pat. Off. . |
| 0 458 438 | 11/1991 | European Pat. Off. . |
| 95/01031 | 1/1995 | WIPO . |

*Primary Examiner*—Douglas W. Olms
*Assistant Examiner*—Kenneth Vanderpuye
*Attorney, Agent, or Firm*—Burns, Doane, Swecker & Mathis, L.L.P.

[57] ABSTRACT

An ATM-switch for high transmission rates is built of primary switch cores. A path for a cell through the switch is determined at the arrival of the cell at the switch and this path is coded as a control word, which is transferred through the switch in parallel to the cell itself. The control word indicates directly how the transfer through each primary element of the switch is to be made. Each primary element must only have two inputs and two outputs. The control word then consists of one bit for every stage of primary switch elements in the switch and this bit indicates directly the output from which the cell is to be forwarded from a considered switch element. The switch cores are constructed of intermediate storage memories, one for each pair of one input and one output, and these intermediate storage memories can have a rather limited capacity for storing only a few cells together with their associated control words. The control word indicates to a cell arriving at an input the intermediate storage memory, where the cell is to be intermediately stored. The intermediate storage memories can be shift registers and independent units take care of the storing of cells and the forwarding of cells from the switch core.

16 Claims, 6 Drawing Sheets

ATM SWITCH CORE

This application is a continuation of International Application No. PCT/SE96/00610, filed May 9, 1996, which designates the United States.

TECHNICAL FIELD

The present invention relates to a switch core intended for transmission of data cells using high transmission rates.

BACKGROUND

Telecommunication techniques of today, for example as within the ATM-technique, impose higher and higher requirements on data transmission rates. In particular this concerns switches since they are to perform switching, multiplexing, etc., which can require even higher internal transmission rates. It can become interesting to more and more use rates in the range above Gbit/s and port for a switch within a near future, that is different from the presently highest used rates of 155 and 622 Mbit/s.

ATM-switches of various kinds are known, but they have usually a too complex structure to be successfully used for high transmission rates. A few examples of proposed designs are presented hereinafter.

The published International patent application WO-A1 95/01031 discloses a switch for receiving and forwarding data cells. The switch contains a multitude of ports connected to user terminals. A switch core 4 connects the ports and allows communication between them. The switch ports contain devices for providing the cells with information in regard of the selected path through the switch. An information part 14, "tag", see FIG. 2, associated with the cell, is created in the input port, at which the cell arrives. This part contains information on the selected route through the switch core and has a bitfield for each column of the core. Such information, associated with a considered cell, can be transmitted in advance to the switch core. A control unit ("scheduler") in the switch core receives the routing information and decides at which times different cells are to be transmitted from the input ports to the output ports in order not to interfere with transmission of other cells. Buffer memories for intermediately storing cells have only to be arranged in the output ports and not in the very core, resulting in a simple structure thereof. The information on the path for a considered cell is thus transmitted together with another cell that is received some cell cycles before the considered cell while it is intermediately stored in the input port.

In U.S. Pat. No. 4,623,996 a packet-switching node is described that communicates data packets containing information ("routing tag signals") in regard of the output to which the packets are to be forwarded. A multitude of queue selectors are individually connected between a multitude of input ports and output ports. Moreover, the switching node contains storage units ("queue sets") connected to each input port. Each queue selector sorts the data packets that are transmitted to the selector node, according to the information which determines each output port. With the storage units different control units ("arbitrators") are connected that guides the packets to the indicated output port. A queue selector is arranged for each input and further, it is connected to several storage units ("queue sets") specific to the input, one unit for each output.

In the published European patent application EP-A1 0 405 042 a cell-based switch of multi-stage type is disclosed, the output port being determined by a control word that is created in a control unit 36. The control word contains the address of the output port for the data cell to be transmitted and routing information that is divided for the respective switch stage. In FIG. 8 it is illustrated how the control word is processed. A unit 83 for selection of output port is used. Outgoing data cells are buffered individually in a "transmit adapter" for each output port.

SUMMARY

It is an object of the invention to provide an architecture of a data cell switch, in particular an ATM switch, intended for transmission rates in the range of gigabits per second for each port.

It is a further object of the invention to provide a switch core to be used in a switch for data cells and having such an structure that high transmission rates can be achieved.

These objects are achieved by the invention, the detailed characteristics of which appear from the appended claims.

An ATM-switch is thus constructed of primary switch cores having a relatively simple structure. A path for a cell through the switch is determined at the arrival of the cell to the switch and this path is coded as a control word, which is transferred through the switch in parallel to the cell itself. The control word indicates directly how the transmission through each primary element of the switch is to be made. Particularly simple is the case where every primary element is an element having only two input terminals and two output terminals. Then the control word consists of only one bit for every stage of primary switch elements in the switch and this bit indicates directly the output terminal from which the cell is to be forwarded in a considered switch element. Worded a little differently, thus a switching network is built of several switch cores and is intended to be used in particular in an ATM-switch, for transferring data cells at a high transmission rate. A path of the cell through the network is determined and this path is coded by means of a control word that is transferred in parallel to the cell through the network. The control word indicates directly the manner in which the transfer through each switch core is to be made. These control words are communicated on additional lines that are arranged between input ports and output ports in a switch core, also called a primary switch unit. For each such input a selector is arranged for receiving control words. The selector is arranged to take information from the control word, from one or several specific positions in the word. These bits indicate the output of the switch unit to which the cell is to be transferred. Particular intermediate storage memories are also associated with each input and output.

Generally thus, a switching network for transfer of data cells comprises at least one input port, at which cells arrive to the switching network, several output ports, on which cells are forwarded from the switching network, and primary switch units, the switch cores mentioned above, which have inputs and outputs. The switch units are so connected to each other by means of suitable lines and are so connected through suitable lines to input ports and output ports of the switching network, that a cell arriving at an input port of the network can be forwarded from a selectable output port of the network. The input port or the input ports of the network is/are so designed that at the arrival of a cell to the input port, a path is determined for the cell through the switching network to an output port and therefrom a control word, by means of which the path is defined in a suitable way, i.e. the path is coded by means of a control word, which can directly indicate the path. Additional lines are provided between input ports and output ports and between the primary switch units themselves for transferring the control word in parallel to the cell through the switching network.

For handling the control word a selector is provided for every input terminal of a primary switch unit and it is connected to receive a control word incoming in parallel with a cell. The selector is arranged to collect information from a received control word in regard of the output terminal of the switch unit from which that cell is to be transmitted that arrives in parallel to the control word. In order to achieve a quick selection of the path inside the switch unit, the selector of every primary switch unit is advantageously arranged to take the information from the same position in the control word, i.e. for example the first bit, the second bit, etc.

A switch unit for transfer of data cells in a switching network according to the above comprises generally several input ports or terminals and several output ports or terminals. Every input terminal comprises one line for receiving a cell and one parallel line for receiving a control word. In the same manner, every output terminal comprises one line for forwarding a cell and one line in parallel to this line for forwarding a control word. Further, every line for receiving a control word is connected to a selector for controlling the path of the cell through, among other things, the switch unit. Such a selector takes information from a received control word and transmits, as guided thereby, a signal to only one of several intermediate storage memories, which are connected through suitable lines to the selector, in order to indicate to them that one of these memories which is to receive the data cell associated with the control word, i.e. the cell that is being transmitted, in this case arriving or having arrived, at the same time as the considered control word. As above, the selector can be arranged to collect information from a predetermined position or predetermined positions in a received control word, in particular so that the information in this position or these positions directly indicates, without any decoding, the output terminal from which the cell is to be forwarded from the switch unit. For example, in the case where the switch unit has four output terminals, in a possible embodiment four bits in the control word can always be taken from the same positions therein, i.e. having the same sequential or serial number in of the control word. Only one of these bits is then set, i.e. is not equal to zero, to indicate the output terminal from which the cell is to be forwarded.

According to another aspect, the switch unit for transferring data cells must comprise at least two input terminals and at least two output terminals. With every input terminal individual intermediate storage memories are associated, so that one intermediate storage memory is provided for every output terminal. The intermediate memories are advantageously constructed as shift registers and in the preferred case every intermediate memory comprises several shift registers operating in parallel to each other. Each intermediate memory is then associated with only one predetermined input terminal and with only one predetermined output terminal. Control means are arranged so that a cell arriving at an input terminal can be stored in one of the intermediate memories associated with the input terminal and so that a cell stored in an intermediate memory can be forwarded from the output terminal which is associated with that intermediate memory. Advantageously the control means contain switching or selecting units, in order to be able to carry it out, so that one individual switching unit that is operating independently is provided for every output terminal. Such a switching unit is then arranged to select, according to some suitable method, one of the intermediate memories, which are associated with this output terminal, in order that a cell from the selected intermediate memory is to be forwarded from the output terminal, in the case where one or more cells are stored in these intermediate memories. Also, input control units are advantageously incorporated in the control means, so that one individual input control unit that is operating independently is provided for every input terminal. An input control unit, the selector, is then arranged to guide a cell arriving at the input terminal to only one of the intermediate memories, which are associated with this input terminal.

With each such intermediate storage memory for cells is advantageously an intermediate storage memory arranged for storing control words. An intermediate memory for data cells comprises according to what has been discussed above in the preferred embodiment at least two shift registers operating in parallel with each other and an entire data cell can be stored in each register. A control unit accomplishes the transfer of a data cell, to be stored in the intermediate storage memory, to an empty shift register. In the same way an intermediate storage memory for control words comprises shift registers operating in parallel to each other, these shift registers being associated with a corresponding shift register in an intermediate storage memory for data cells. The control unit for transferring data cells to the intermediate storage memory is arranged to also transfer, at the same time when a data cell is transferred to a vacant or empty shift register in the intermediate storage memory for cells, a control word associated with the cell to a corresponding shift register comprised in the intermediate storage memory for control words.

BRIEF DESCRIPTION OF THE DRAWINGS

The invention will now be described in greater detail with reference to non-limiting exemplary embodiments and with reference to the accompanying drawings, in which.

DETAILED DESCRIPTION

Figure 1:
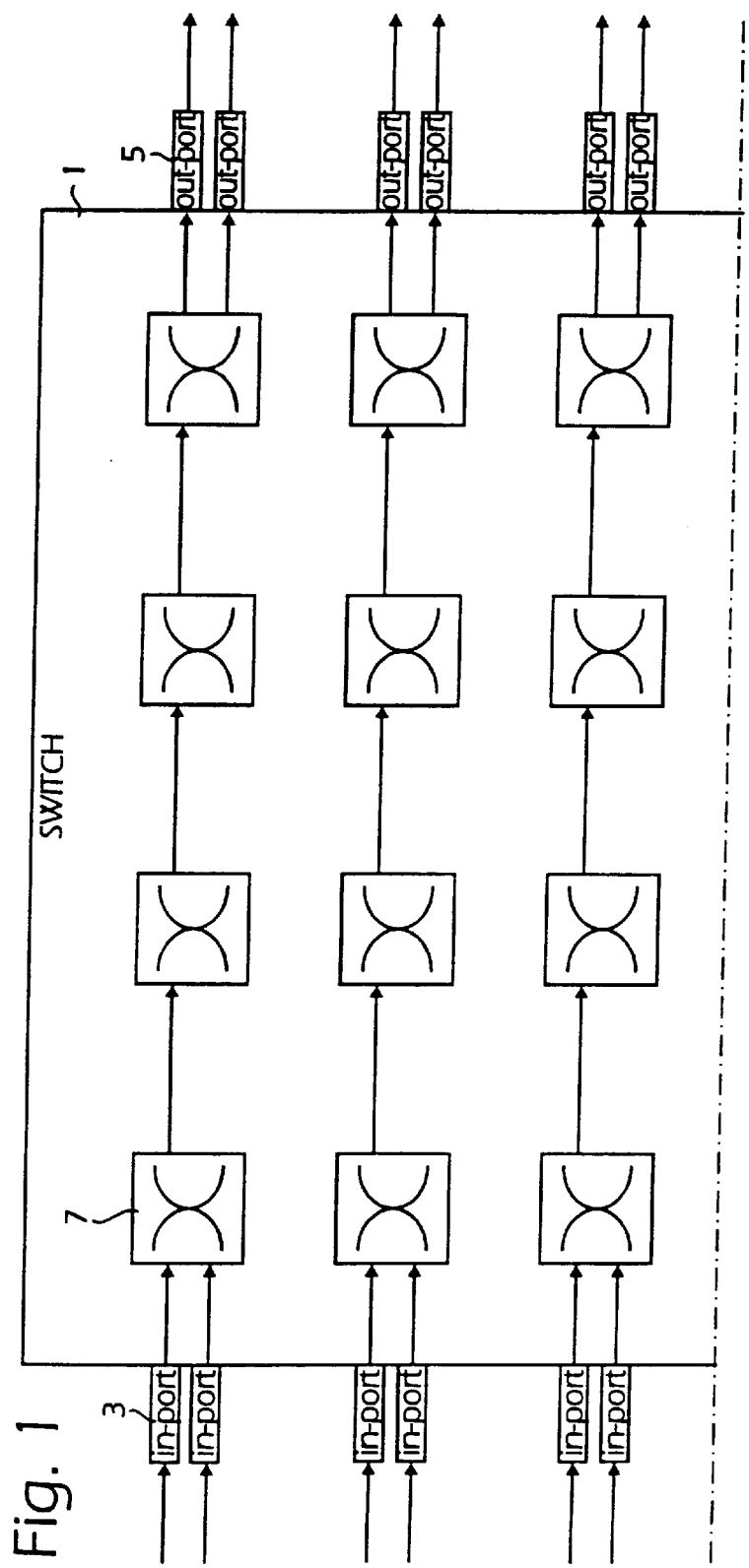
FIG. 1 schematically shows a switching network constructed by interconnecting a number of primary switch units or switch cores.

In FIG. 1 a switch 1 for primary data packets or cells, arriving at input ports 3 and leaving the switch 1 at output ports 5, is schematically illustrated. The switch 1 comprises a network of primary switch cores 7, which each one also performs a transfer of cells from their inputs to their outputs.

The switch cores 7 are here shown as having a minimal configuration in the shape of 2×2-elements, i.e. having two inputs and two outputs, and they are located in a network having a depth of four switch cores 7, so that thus every cell must pass through four switch cores 7 during its travel from an input port 3 to an output port 5 of the switch 1.

Figure 2:
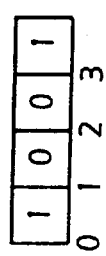
FIG. 2 shows the format of a control word produced at the arrival of an ATM-cell at an input port of the switching network.

At the arrival of a cell at an input port 3 the intended path of the cell through the switch 1 is determined by logic circuits in the input port, and thus those primary switch units 7 through which it will pass. Then a control word is formed by the circuits of the input port 3 in the shape of a sequence of serial numbers of output ports of every switch core through which the cell is to pass. In the case of 2×2-elements only one binary unit is required for every stage or column in the switch 1 and the control word then obtains the configuration according to FIG. 2, i.e. it consists of a sequence of four bits. Thus, in the example shown the control word can indicate, having one bit set in the first position, in the case where the cell arrives first to switch core No. 1 in the first stage, that the cell is to be forwarded from the second output port of this switch core. The cell is thereafter to be transferred to a switch core in the second stage or column and therefrom be forwarded from its first output port, after that to a switch core of the third column and therefrom be forwarded from its first output port and finally from the second output port of a switch core in the fourth column.

Figure 3:
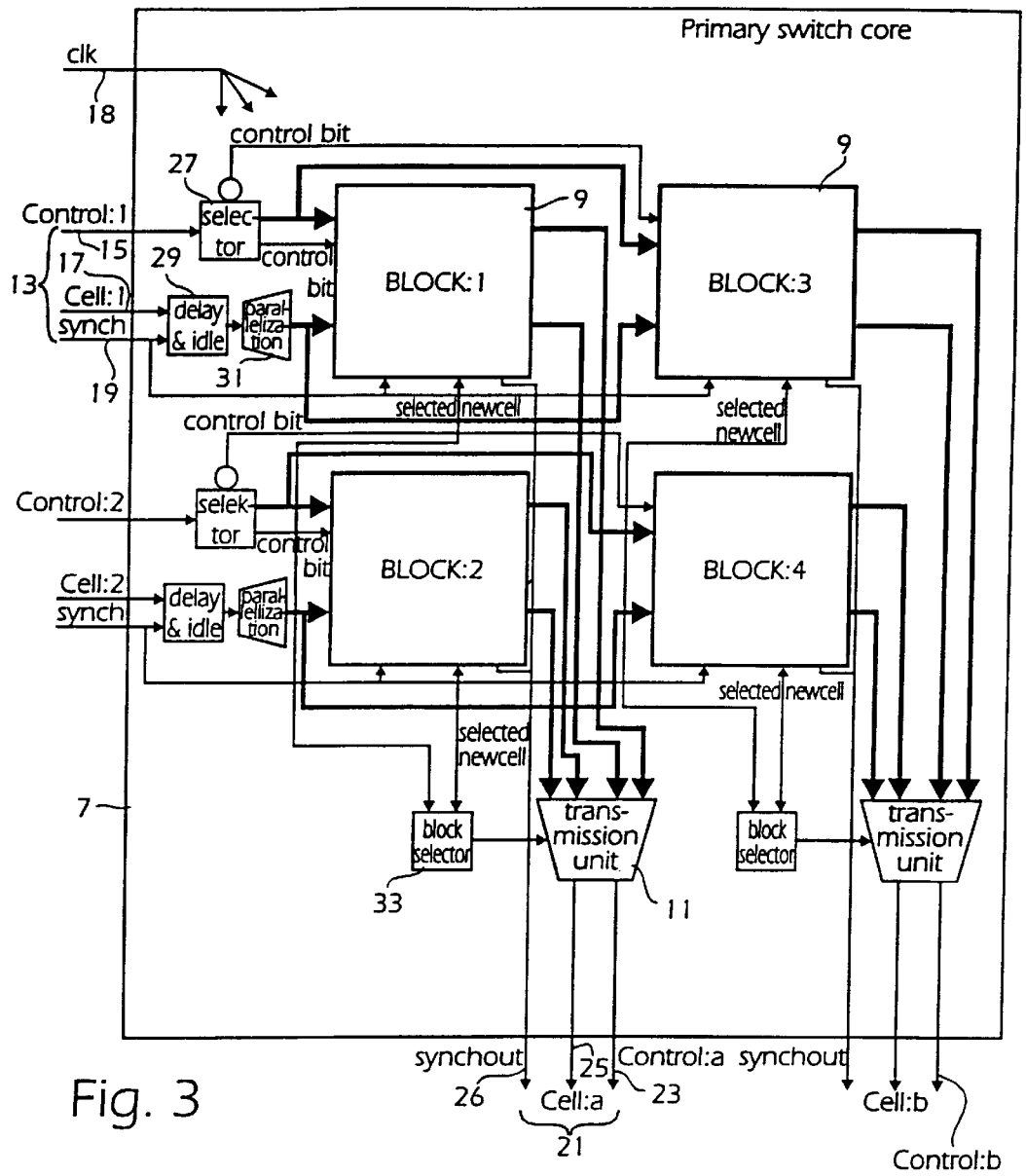
FIG. 3 shows the structure of a switch core.

The construction of a primary switch core 7 of the kind described above is schematically shown in FIG. 3. The switch core comprises four block units 9 denoted BLOCK:1, BLOCK:2, BLOCK:3, BLOCK:4 and two transmitting units 11. Each of the two input ports 13 of the switch core 7 comprises connection terminals for several lines, that is a control line 15 for serial transfer of control words, also denoted "Control:1" and "Control:2" respectively, a line 17 for serial transfer of the cell itself denoted "Cell:1" and "Cell:2" respectively, and a line 19 for synchronizing signals denoted "synch" for indicating the beginning of every cell serially transmitted on the line 17, and the beginning of the control word transmitted in parallel thereto. Each of the two output ports 21 of the switch core 7 comprises connection terminals for a line 23 for serial transmission of control words and denoted "Control:a" and "Control:b" respectively, a line 25 intended for serial transmission of the cell itself and denoted "Cell:a" and "Cell:b" respectively and a line 26 for transmitting a synchronizing signal "synchout" for indicating the beginning of the cell and the control word to the switch core that is next connected. Each block 9 comprises buffer memories in the case where delays and queue formation occur in the switch 1 or internally in the switch core 7. A control word on one of the incoming control lines 15 arrives to a selector 27, which interprets the control word and controls the selection of a block unit for storing intermediately an arriving cell. The selector 27 issues on its output terminals signals during the time period when the cell is read, and contains for this purpose a suitable timing circuit, not shown. Furthermore, to every switch core 7 a bit clock "clk" is distributed on a line 18, the clock having a high frequency and indicating the time position of the individual bits of every cell that is being transferred between the switch cores.

The incoming line 17 for transferring the cell to the switch core 7 is connected to an input unit 29 denoted "delay and idle". This unit can comprise a suitable shift register, see more below, and produces a delay having a chosen, suitable length so that from the time when the cell has been received sufficient time is available in order to have time to allocate a suitable memory space in a block unit 9 and so that there has been time enough for preparing this memory space for storing the cell. In this circuit unit also recognition of cells which comprise idle cell patterns, "idle cells", can be performed and which are discarded and are not forwarded to any block unit 9. From the input unit 29 the cell is transferred to a parallelizer circuit 31, which handles the cell and forwards it in a partly parallel shape to be read into one of the two block units 9 provided for every input port 13, e.g. so that every byte or octet of the cell is transferred in a parallel manner to a block unit. Thus, a multitude of lines extend from the parallelizer circuit 31, in the example at least eight lines, to each of the two block units 9 in the switch core 7 to which an arriving cell can be transferred.

Also the control word is processed in the same manner and therefor in the selector 27 a register is provided that is similar to the input register 29 for the cell and a parallelizer circuit similar to the circuit 31. From a position in the register of the selector 27, which corresponds to the considered switch core, a control signal is issued as a logic "one" or "zero" to the block units 9, where the signal to one of the block units is inverted. For example the control word can, at its arrival to a considered switch core 7, always, in its first position, contain the control bit for this switch core 7. The routing path word or control word must then be rotated or shifted cyclically by a step of one bit every time when a cell passes a switch core 7.

When a cell is to be forwarded from the switch core 7 and the cell is stored in a block unit 9 therein, it is accomplished by a block selector 33, which for each input port is connected to only one of the two block units 9, to which cells arriving at this input port can be transferred and intermediately stored. The block selector 33 executes this using signals on a bidirectional communication line between each such block unit 9 and the block selector. On this line, where signals denoted "selected" and "newcell" are exchanged, the block unit 9 thus informs the block selector 33 that it has a cell which is to be transmitted. The block selector 33 determines according to some suitable algorithm the block unit 9 from which a cell is to be forwarded from the switch core 7. It can for instance be selected so that one cell is transmitted alternatingly from the two block units 9, as long as they both contain any stored cells. In the case where only one block unit 9 has any stored cells, this block unit is of course selected. Thereafter, the block selector 33 transmits a signal, the above mentioned signal "selected", to the selected block unit 9 signifying that this block unit is selected and that the next cell therefrom will be delivered. A signal indicating that a cell is now to be forwarded from the switch core is then also transmitted to the transmitting unit 11 associated with the block selector 33. The transmitting unit 11 receives, when it receives this signal, a cell from the corresponding block unit 9 in a partly parallel shape, for instance byte by byte as above, converts it into a fully serial shape and forwards it along with the control word that is processed in the same manner. When no cells are to be forwarded from an output port, the transmitting unit 11 transmits an idle cell pattern according to the above.

Figure 4:
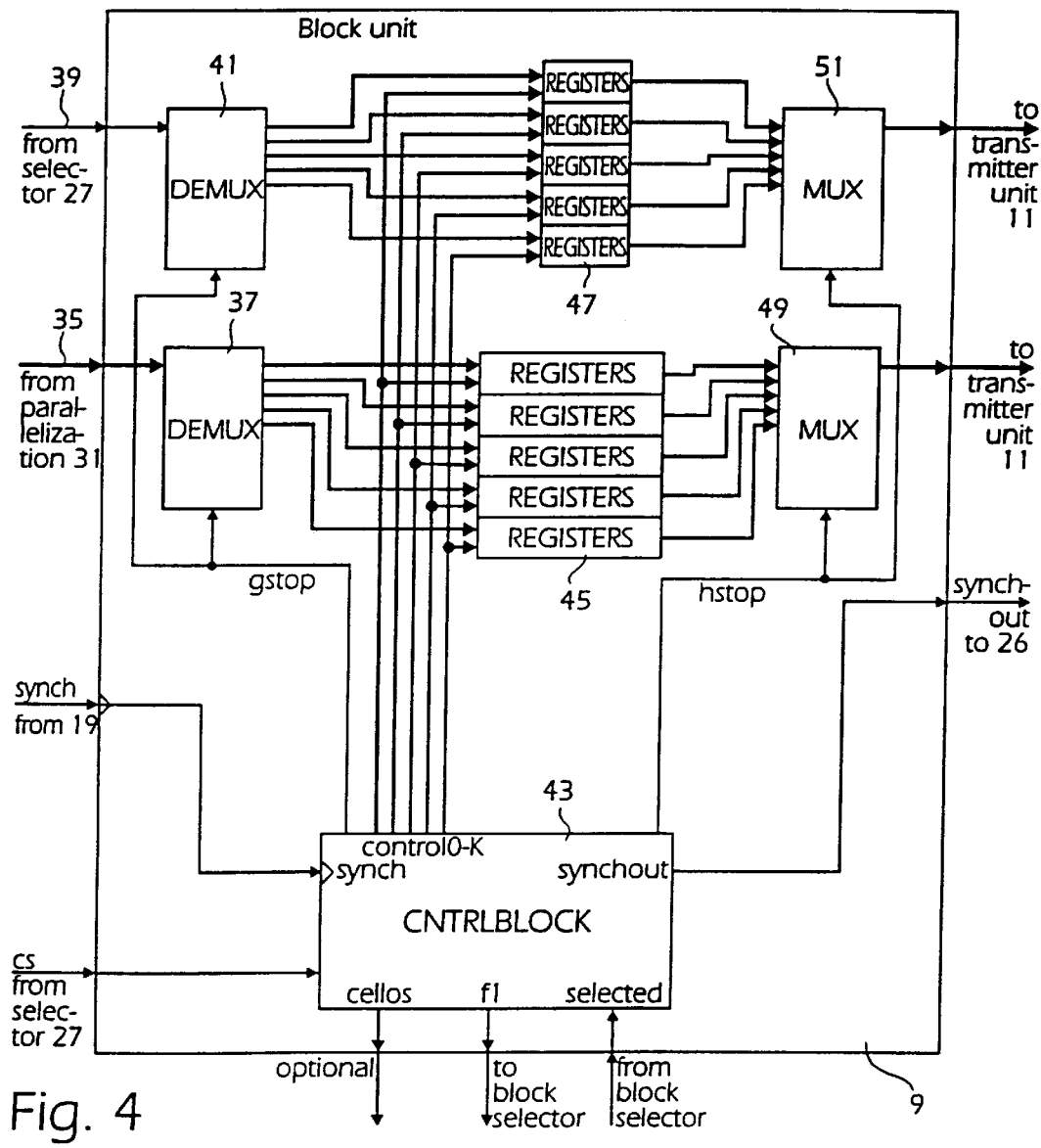
FIG. 4 shows one of four buffers together with their associated control logic circuits, which are arranged in a switch core.

The components of a block unit 9 appear from FIG. 4. The cell arrives at the parallel lines 35 in the shape of several words, e.g. a number of bytes, to a demultiplexer 37. A control word arrives at the same time from the selector 27, similarly on parallel lines 39, to a second demultiplexer 41. The control bit, also denoted "cs", from the selector 27 for selecting block unit 9 arrives at an input of a control unit 43 and enables it. The control bit selects whether this particular block unit 9 is to receive the cell, which is now arriving on the parallel lines 35 from the parallelizer circuit 31. The control unit 43 is connected to the demultiplexers 37 and 41 and controls the selection of a suitable output thereof by means of signals "gstop". From the control unit 43 enabling lines "control0-K" also extend to each of several registers 45, which each one can also receive signals from the first multiplexer 37. Corresponding registers or buffer fields 47 are provided for the control word and they are thus connected to the second demultiplexer 41. They can, like the registers 45, be enabled through control lines from the control unit 43, by the same signals as they. Further, the registers 45 for storing the cells and the registers 47 for the routing words are connected to output multiplexers 49 and 51 respectively. These are also controlled by signals denoted "hstop" on lines from the control unit 43 and their outputs are connected to the corresponding transmitting unit 11.

The registers 45 and 47 are constructed as a number of parallel shift registers, which are clocked with a lower frequency (1.25 GHz) than the cell itself that arrives in a serial shape (10 GHz). This achieves a lower power consumption and a simpler construction of the registers compared to the case where they would consist of only one shift register.

The control unit 43 contains two independent state machines, one for control of the reading of the cells and the corresponding control words into the registers 45 and 47 and one for control of the transfer of cells and the corresponding control words from the block unit 9 to the corresponding transmitting unit 11. The synchronizing signal "synch" also arrives to a block unit 9 and from the block unit the corresponding output synchronizing signal "synchout" is issued for a cell forwarded from the switch core, where the synchronizing signal "synch" is transferred to, and the synchronizing signal "synchout" is generated by the control unit 43.

The reading routine comprises in short the following steps. If the control bit signal "cs" from the selector 27 is active, the reading of a cell begins. From the lines 35 extending from the parallelizer circuit 31 the cell is then transmitted in several smaller parallel portions to the input demultiplexer 37 and in the corresponding way the control word is transferred from the selector 27 to the other demultiplexer 41. From the control unit 43 a suitable signal, "gstop", is transmitted to the two demultiplexers 37 and 41, so that an output therefrom is opened, whereby data present on the inputs of the demultiplexers can be written byte by byte, using suitable clock signals into one of the registers 45 for cells and into one register 47 for the control words having the corresponding serial number.

The method of transmitting a cell from the block unit 9 is carried out in such a way, that if a signal having the meaning "selected" is received from the corresponding block selector 33, the transmission of a cell is started. The registers 45 and 47 next in turn are selected so that the data, which have been stored therein during the longest time are allowed to be transmitted. An enabling signal for these registers is issued at the same time as the two output multiplexers 49 and 51 open their inputs, which are connected to these registers, commanded by the signal "hstop". Hereby the cell and its associated control word are read in a partly parallel shape, like above, from their registers where they have been intermediately stored into the corresponding transmitting unit 11 by means of suitable control and clock signals.

Figure 5:
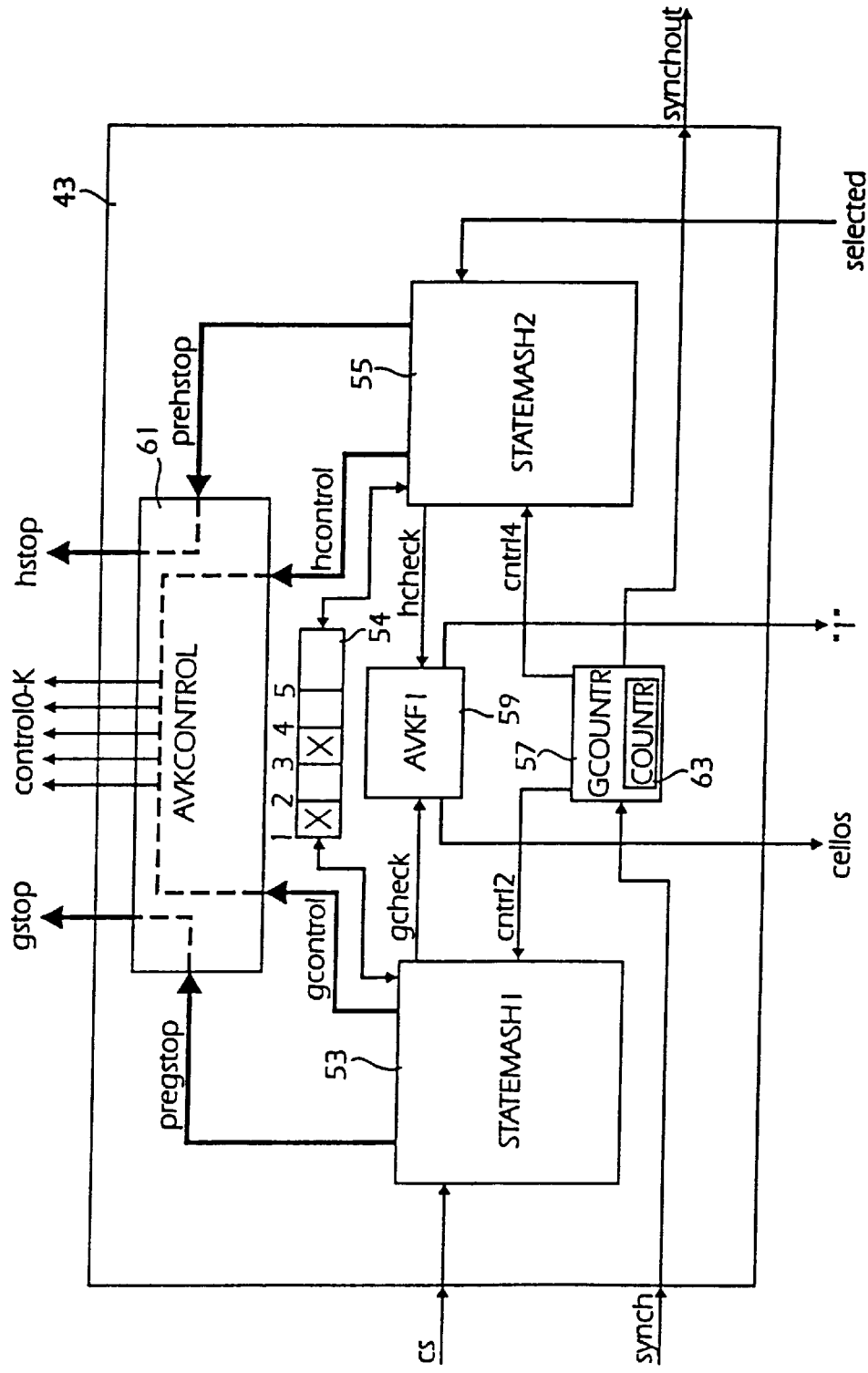
FIG. 5 shows the structure of the control logic circuits, which are associated with every buffer of a switch core.

The structure of a control unit 43 for a block unit 9 appears from FIG. 5. It comprises two state machines 53, 55 denoted "STATEMASH1" and "STATEMASH2" respectively, implemented by means of suitable digital circuits. Further, a counter block 57 "GCOUNTR", a level block 59 "AVKF1" and a synchronizing output unit 61 "AVKCONTROL" are provided.

The counter block 57 receives as an input signal the synchronizing signal "synch" incoming to the switch core 7 from the line 19. Output signals are "cntrl2" and "cntrl4", which are provided to the state machines 53 and 55 respectively. Furthermore, the synchronizing signal "synchout" that is forwarded from the block unit 9 and the whole switch core and that indicates the beginning of a cell transmitted from the switch core 7, is generated in the counter block 57. In the counter block 57 a counter 63 denoted "COUNTR" is included, which is in principle incremented by one step at periodically repeated time intervals given by a clock that is internal to the switch core or the block unit and is set to its start value every time when the input synchronizing signal "synch" becomes active, for instance when a positive pulse edge is detected therein.

Figure 6:
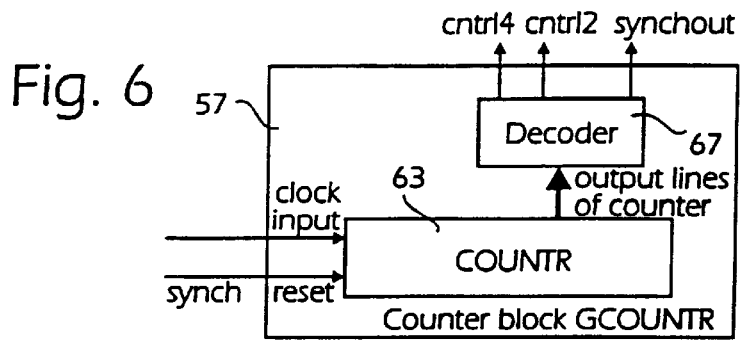
FIG. 6 shows the structure of a timer being part of the control logic circuits.

The construction of the counter block 57 appears from FIG. 6. The counter "COUNTR" 63 receives on its clock input a clock signal having a high frequency of the same magnitude of order as the frequency of the octets of the signal itself, i.e. for instance a clock signal of 1.25 GHz, see below. The signal in every position of the counter 63 is fed to a combinatorial network or decoder 67, which has three outputs and provides a signal on its first, second and third output respectively, when the value of the counter is equal to suitable chosen numbers for special functions, e.g. the values 49, 51, and 53. These outputs then provide the signals "cntrl 4", "cntrl2" and "synchout" described above respectively. Further, the counter 63 receives on its reset input denoted "reset" the synchronizing signal "synch", which signals the beginning of a cell.

Figure 7:
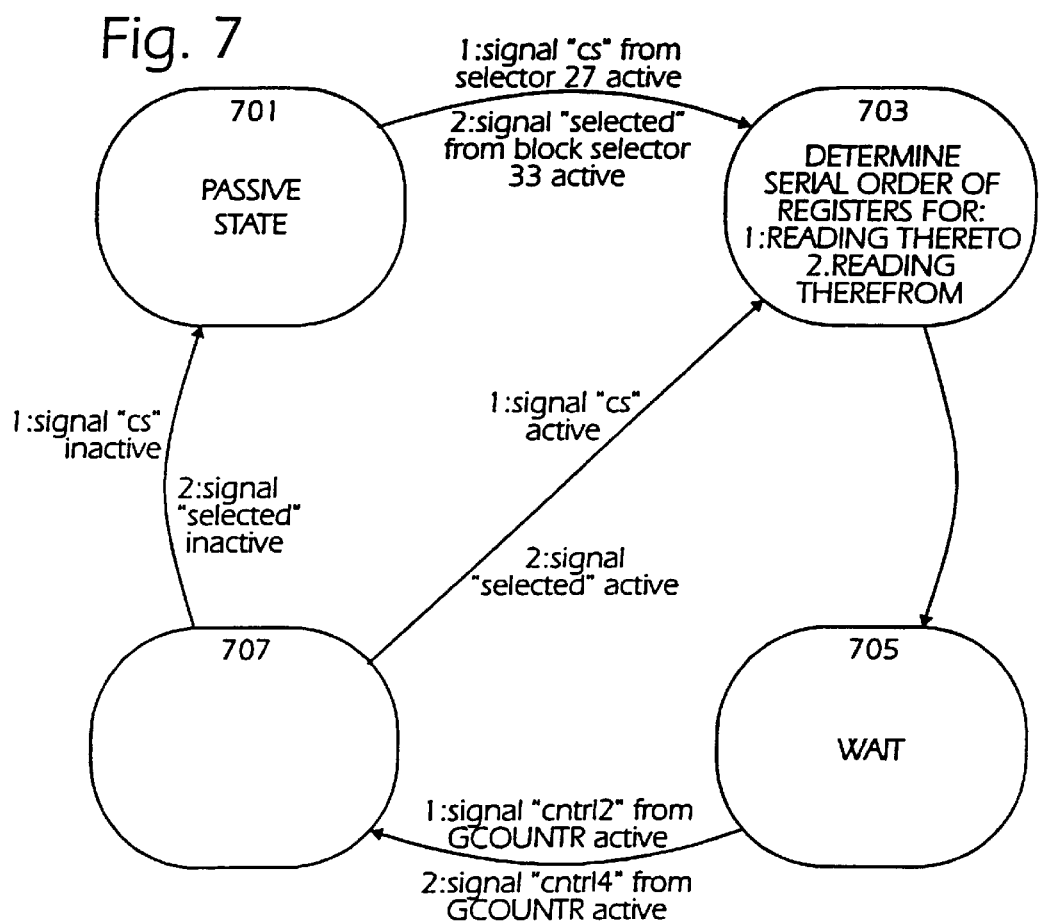
FIG. 7 shows, in the shape of state machines, the program routines, which are executed by the control logic circuits for reading into and for forwarding from the buffer.

The two state machines 53, 55 STATEMASH1 and STATEMASH2 are essentially identical and their function is represented by the state diagram of FIG. 7, where the parts only concerning the first state machine 53 are preceded by 1: and the parts only concerning the second state machine are preceded by 2:.

The function of the first state machine 53 for handling the reading of a cell and its control word into registers 45 and 47 respectively will first be described. The state machine 53 is, when nothing in particular is to be performed or is occurring, in an idle or passive state 701. When a signal indicating that a cell has arrived to the switch core 7 in order to be intermediately stored in the considered block unit 9 is received on the line from the selector 27, the state machine passes to a state 703. In this state a routine, which not is described here in detail, is performed in which, according to some algorithm, an empty position in the registers 45 and 47 is selected. In some manner it is indicated to this algorithm those registers which are empty and those which are occupied. A possible solution is to mark in a table 54 that the selected position becomes occupied. When this selection has been performed, output signals "gcontrol", "pregstop" and "gcheck" from this state machine adopt an active level for some suitable time period as long as the cell is read. However, in the case where an empty intermediate storage register is not available, a cell is lost in this embodiment. The signals "gcontrol" and "pregstop" are provided to the output synchronizing block 61. The signal "gcontrol" indicates the position in the registers 45 and 47 where the arriving cell and the arriving control word respectively are to be stored. The signal "pregstop" indicates to the input demultiplexers 37 and 41 the output line to which the arriving cell and its control word respectively are to be provided. The signal "gcheck" is communicated to the level block 59 and indicates only that now a new cell together with an associated control word is stored.

After completing this entire routine, the state machine 53 continues to a state 705, in which the state machine does not perform anything particular during the remaining time of the reading of the cell. During this the cell and the control word respectively are transferred from the parallelizer unit 31 of the input port and the selector 27 by means of suitable clock signals and shifting in shift registers to their storage positions in the registers 45 and 47 respectively. A transition from this state 705 occurs when the signal "cntrl2" from the counter block 57 is changed to an active level, and then the state machine adopts the state 707. Then, the storing of the cell and the control word should be finished, which is monitored by means of the signal "cntrl2" that will adopt an active level some suitable time after the beginning of the reading operation.

In the state 707 the control bit of the arriving control word is sensed through the line from the selector 27. If it has an active level, the machine continues to the state 703 and in the other case the idle state 701 is adopted.

As has been mentioned above, for the state machine 55 for transmission from the intermediate storage registers 45 and 47, essentially the same state diagram is valid, except that the input signals and the output signals are different and arrive from and are provided to different locations. Also the algorithm for selecting a cell to be forwarded becomes somewhat different. Thus, this second state machine proceeds from the idle state 701 when the signal "selected" is received from the block selector 33. In the state 703, which is then adopted, the cell together with its associated control word, which is to be transmitted, is selected be means of some suitable method. Signals "hcontrol", "prehstop", "hcheck" are made to adopt active levels, when this selection is made. In the case where a table 54 is arranged, the mark indicating that this position is occupied is then removed. The signal "hcontrol" indicates the position in the registers 45 and 47, from which transmission is to be performed, and the signal "prehstop" indicates the input line of the multiplexers 49, 51 on which data are to be forwarded to them, and these two signals are fed to the output synchronizing unit 61. The signal "hcheck" is communicated to the level block 59 and only indicates that a position has become vacant in the registers 45 and 47. After these signals have been issued the machine adopts the state 705 and waits therein until the signal "cntrl4" from the counter block 57 becomes active. During this time period transmission from the registers 45 and 47 is executed by means of suitable control and clock signals. Then the machine 55 continues to the state 707, from which it passes to the idle state 701 in the case where the signal "selected" from the clock switch 33 is not active and otherwise the state 703 is adopted.

The output synchronizing unit 61 receives as input signals the signals "gcontrol", "pregstop" from the state machine 53 for feeding to, and the signals "hcontrol", "prehstop" from the state machine 55 for delivery from the intermediate registers 45, 47. The signal "gcontrol" arrives on a number of separate lines from the state machine 53, where this number corresponds to the number of positions in the registers 45 and 47 for storing a cell and its associated control word, and the signal "gcontrol" then signifies that an active signal level exists on only one of these lines. The same condition is valid for the signal "hcontrol", so that an active signal level thereof is always present on at most one individual line. The signals "gcontrol" and "hcontrol" are combined to an output signal "control0-K" by means of OR-gates, not shown. The output signal "control0-K" is issued in the corresponding way on a number of separate lines, each one corresponding to a position in the registers 45 and 47, and comprising an active signal level on one or at most two of the parallel separate output lines, each one of which then being connected to one of the positions in the registers 45 and 47 respectively. Moreover, the signals arriving at the synchronizing unit 61 are issued in principle unchanged from the unit 61 as signals "control0-K", "gstop" and "hstop", where the latter ones correspond, to the incoming signals "pregstop" and "prehstop", but with a suitable time delay so that the control of the demultiplexers, the multiplexers and the registers will be correct.

Figure 8:
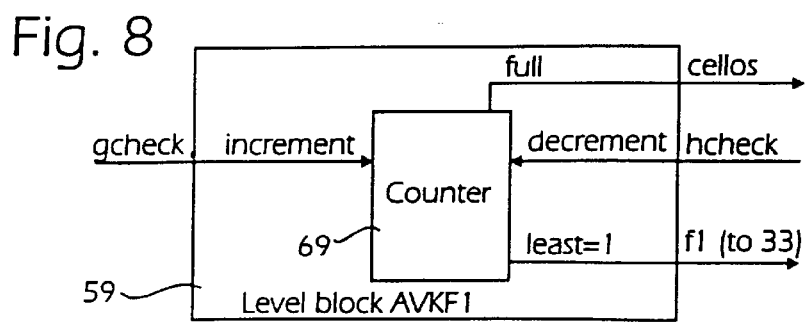
FIG. 8 shows the structure of a counter unit for the filling degree of a buffer.

The structure and function of the level block 59 appear from FIG. 8. To this block the signal "gcheck" is communicated from the first state machine 53 and the signal "hcheck" from the second state machine 55. On its outputs the block 59 issues the signal "cellos", which signifies that all positions in the buffer registers 45, 47 are occupied and that a new cell cannot be stored, and a signal "f1", which indicates to the associated block selector 33, that at least one cell together with its associated control word is stored in this block unit 9. The block 59 comprises therefor a counter 69, which is incremented when receiving the signal "gcheck" and is decremented when receiving the signal "hcheck". The counter 69 issues by means of a suitable gate network, not shown, the signal "cellos" indicating that the block unit is full, in the case where its stored value is equal to the total number of positions in the intermediate storage registers 45 and 47, which in the illustrated case is equal to five positions. Further, a signal is issued in the case where the value of the counter is higher or equal to 1, or equivalently thereto different from zero, and this is the signal "f1".

Figure 9:
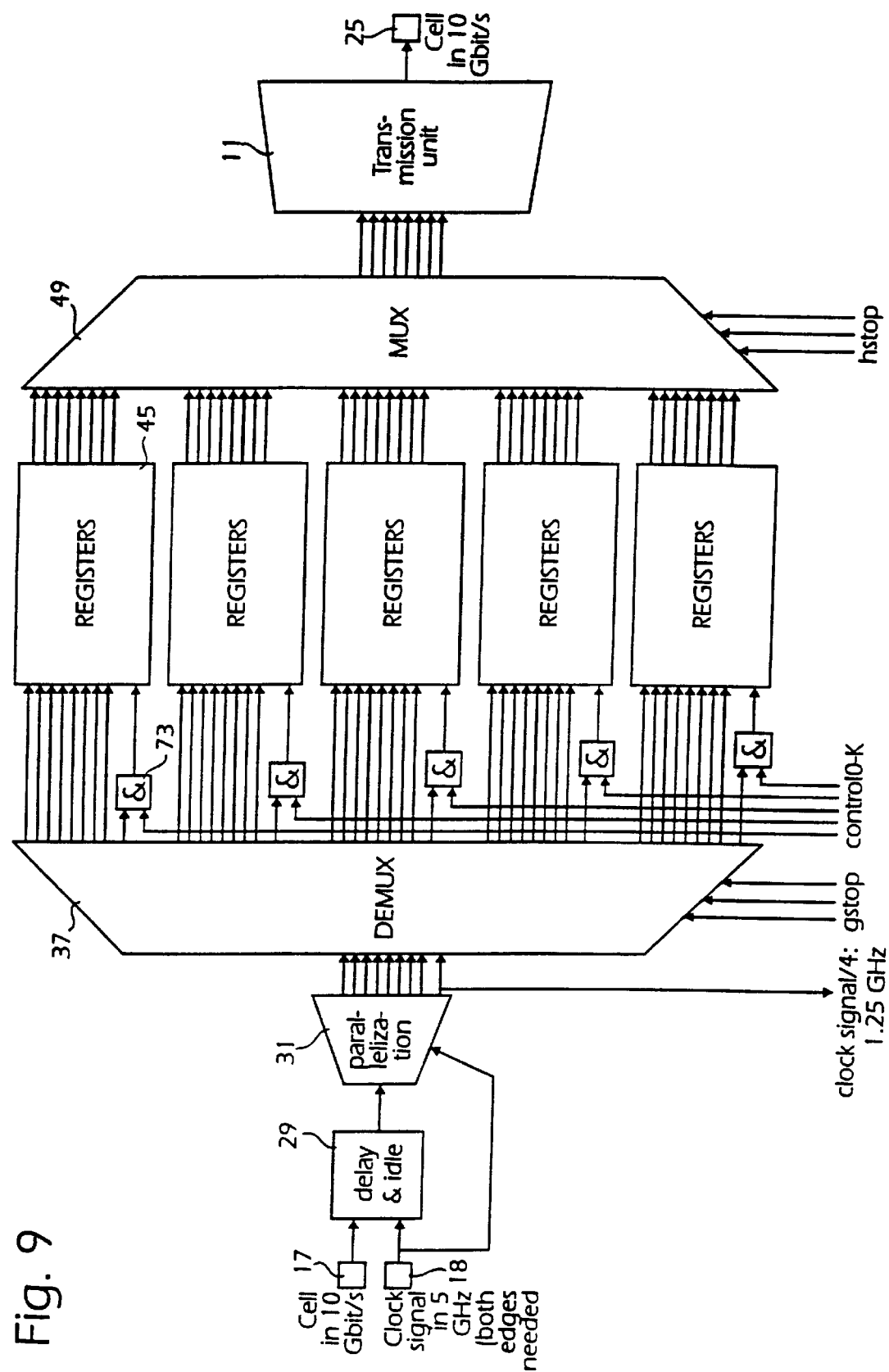
FIG. 9 shows a schematic block diagram for illustrating, in one picture, reading and forwarding a cell, where the details concerning the control word are not included.

With reference to FIG. 9, where the actual flow of a data cell through a switch core is schematically shown, the transfer of cells to the intermediate memories and the delivery therefrom will now be described in greater detail. Hence, a cell arrives at a bit frequency of 10 Gbit/s and in parallel thereto a clock signal of 5 GHz is provided, which indicates the positions in time of the individual bits of the cell. From the clock signal a slower clock signal having a frequency of 1.25 GHz is generated in a frequency divider, which is arranged in the parallelizer unit 31. The cell arrives to a shift register in the parallelizer unit 31 and is then clocked by the two pulse edges, i.e. both the positive and the negative pulse edge, of the 5 GHz clock signal. When the first bit of the cell arrives at the end of this shift register, the first eight bits are communicated in a parallel manner to the input of the demultiplexer 37. The signal "gstop" from the control unit 43 has already become active in order to select the output line of the multiplexer 37 that is to be open. The slower clock signal of frequency 1.25 GHz, which is the type symmetric clock signal (50% "duty cycle"), is used for clocking one byte at a time into the eight parallel shift registers from which each register 45 is built. In order to accomplish it the slower clock signal is connected to an AND-gate 73, to the other input of which one of the lines carrying the control signal "control0-K" from the control unit 43 is connected. The control signal "control0-K" has one bit corresponding to the selected intermediate storage register 45 set active on this line extending to the AND-gate 73. Hereby the cell will be written into the selected register 45. After the bits 1–8 of the cell have been read into the register 45, the bits 9–16 are read during the next clock cycle of the slower clock signal. This is repeated until the entire cell has been received by the selected intermediate register 45. After this the activating signals "control0-K" and "gstop" cease to be active for the selected register and for the demultiplexer 37. The cell is now stored in the eight parallel shift registers and is not affected until it is to be transmitted.

When delivering an intermediately stored cell, an enabling pulse in the signal "control0-K" is achieved in the same manner as above, i.e. on one of the corresponding lines a pulse set to active state is provided, and one enabling pulse "hstop" from the control unit 43, which signals to the multiplexer 49 to open the selected input. In the delivery operation the shift registers included in the selected intermediate storage register 45 are clocked in the same manner as in the reading operation. From the multiplexer 49 the cell, divided into bytes, is then transferred to the transmitting unit 11. It comprises a suitably designed shift register, which is clocked by both the positive and the negative pulse edges of the 5 GHz clock signal so that the cell will be transmitted serially.

What is claimed is:

1. A switching network for transfer of data cells, comprising
    at least one input port, on which cells arrive to the switching network,
    a number of output ports, on which cells are forwarded from the switching network,
    primary switch units having inputs and outputs, which are so connected to each other by suitable lines and so connected through suitable lines to input ports and output ports, that a cell arriving to an input port of the network can be forwarded from a selectable output port of the network,
    that the at least one input port is arranged so that at arrival of a cell to the input port a path is determined for the cell through the switching network to an output port and therefrom a control word, by which the path is coded,
    additional lines between input ports and output ports and between the primary switch units themselves are provided for transferring the control word in parallel to the cell through the switching network.

2. A switching network according to claim 1, wherein for an input of a primary switch unit a selector is provided, which is connected to receive a control word and to get information therefrom in regard of the output of the switch unit the cell that is arriving in parallel to the control word is to be transferred.

3. A switching network according to claim 2, wherein the selector in all primary switch units is arranged to get the information from the same position in the control word.

4. A switch unit for transfer of data cells, comprising inputs and outputs, wherein
    each input comprises a line for receiving a cell and a line for receiving a control word,
    each output comprises a line for forwarding a cell and a line for forwarding a control word,
    the line to an input arranged for the control word is connected to a selector,
    the selector is arranged to get information from a received control word and to transmit, as guided thereby, a signal to only one of several intermediate storage memories connected to the selector for receiving the data cell associated with the control word.

5. A switch unit according to claim 4, wherein the selector is arranged to get the information from predetermined positions in a received control word.

6. A switch unit according to claim 4, wherein that with each intermediate storage memory for cells is associated an intermediate storage memory for control words that is arranged for storing intermediately control words that are transferred in parallel to the data cells and include information on the paths thereof through the switch.

7. A switch unit according to claim 4, wherein an intermediate storage memory for data cells comprises
    at least two shift registers operating in parallel with each other, and
    a control unit for transferring a data cell that is to stored in the intermediate storage memory to an empty or free shift register.

8. A switch unit according claim 7, wherein
    an intermediate storage memory for control words comprises shift registers operating in parallel with each other each of these shift registers being associated with a corresponding shift register for data cells, and
    the control unit for transferring data cells to the intermediate storage memory for cells associated with an intermediate storage memory for control words is arranged to transfer, simultaneously with transfer of a data cell to an empty or free shift register in the intermediate storage memory for cells, a control word associated with the cell to a corresponding shift register included in the intermediate storage memory for control words.

9. A switch unit for transfer of data cells, comprising at least two inputs and at least two outputs, and further comprising
    intermediate storage memories for each input and for storing intermediately data cells,
    control devices arranged, so that a cell arriving at an input can be stored in one of the intermediate storage memories associated with the input and so that a cell stored in an intermediate storage memory can be forwarded from the intermediate storage memory,
    wherein with each intermediate storage memory for cells is associated an intermediate storage memory for control words that is arranged for storing intermediately control words which are transferred in parallel to the data cells and include information on the paths thereof through the switch unit.

10. A switch unit according to claim 9, wherein an intermediate storage memory for data cells comprises
    at least two shift registers operating in parallel with each other, and
    a control unit for transferring a data cell that is to stored in the intermediate storage memory to an empty or free shift register.

11. A switch unit according claim 10, wherein
    an intermediate storage memory for control words comprises shift registers operating in parallel with each other, each of these shift registers being associated with a corresponding shift register for data cells, and
    the control unit for transferring data cells to the intermediate storage memory for cells associated with an intermediate storage memory for control words is arranged to transfer, simultaneously with transfer of a data cell to an empty or free shift register in the intermediate storage memory for cells, a control word associated with the cell to a corresponding shift register included in the intermediate storage memory for control words.

12. A switch unit for transfer of data cells, the switch unit comprising:
    for each input, a plurality of intermediate storage memories for storing intermediately data cells arriving at the switch unit, control devices arranged for storing a cell arriving at an input in one of the intermediate storage memories associated with the input and for forwarding a cell stored in an intermediate storage memory from the intermediate storage memory, wherein each intermediate storage memory for data cells comprises at least two shift registers operating in parallel with each other, and wherein the control devices are configured for transferring a data cell that is to be stored in the intermediate storage memory to an empty or free one of the at least two shift register,,s of the intermediate storage memory.

13. A switch unit according to claim 12, further comprising switching units included in the control devices, wherein an individual, independently operating switching unit is provided for each input and is arranged to select one of the intermediate storage memories, which are associated with an output, in order that a cell from the selected intermediate storage memory will be transmitted from the output.

14. A switch unit according to claim 12, further comprising input control devices included in the control devices, an individual, independently operating input control device being provided for each of input and arranged to guide a cell arriving at the input to only one of the intermediate storage memories, which are associated with this input.

15. A switch unit according to claim 9, further comprising switching units included in the control devices wherein an individual, independently operating switching unit is provided for each input and is arranged to select one of the intermediate storage memories, which are associated with an output, in order that a call from the selected intermediate storage memory will be transmitted from the output.

16. A switch unit according to claim 9, further comprising input control devices included in the control devices an individual, independently operating input control device being provided for each input and arranged to guide a cell arriving at the input to only one of the intermediate storage memories, which are associated with this input.

\* \* \* \* \*